United States Patent
Tsuji et al.

(10) Patent No.: US 7,503,697 B2
(45) Date of Patent: Mar. 17, 2009

(54) ROLLING BEARING ASSEMBLY HAVING AN IMPROVED RESISTANCE TO ELECTRIC CORROSION

(75) Inventors: Naoaki Tsuji, Kuwana (JP); Hideji Ito, Kuwana (JP)

(73) Assignee: NTN Corporation, Osaka (JP)

( * ) Notice: Subject to any disclaimer, the term of this patent is extended or adjusted under 35 U.S.C. 154(b) by 872 days.

(21) Appl. No.: 10/975,389

(22) Filed: Oct. 29, 2004

(65) Prior Publication Data

US 2005/0094910 A1    May 5, 2005

(30) Foreign Application Priority Data

Oct. 31, 2003    (JP) .............................. 2003-371975

(51) Int. Cl.
*F16C 33/62*    (2006.01)
(52) U.S. Cl. .................. 384/476; 384/492; 384/625
(58) Field of Classification Search .................. 384/476, 384/492, 625
See application file for complete search history.

(56) References Cited

U.S. PATENT DOCUMENTS 5,151,845 A    9/1992    Watanabe et al.

2001/0014545 A1    8/2001    Ito et al.

FOREIGN PATENT DOCUMENTS

| DE | 100 64 021 A1 | 7/2001 |
|---|---|---|
| DE | 101 37 785 A1 | 2/2003 |
| JP | 2-46119 | 3/1990 |
| JP | 2665242 | 6/1990 |
| JP | 5-52223 | 3/1993 |
| JP | 2002-048145 * | 2/2002 |
| JP | 2003-120688 | 4/2003 |

OTHER PUBLICATIONS

Ito Hideji et al., Patent Abstracts of Japan, "Anti-Electrolytic Corrosion Rolling Bearing", Publication No. 2002-048145 and Publication Date: Feb. 15, 2002.
European Search Report, mailed Mar. 2, 2007, and issued in corresponding European Patent Application No. 04025727.1-1523.

* cited by examiner

*Primary Examiner*—William C Joyce

(57) ABSTRACT

To provide an improved rolling bearing assembly having an improved resistance to electric corrosion, which can provide a proper performance and can be assembled at a reduced cost, the rolling bearing assembly includes an inner race (1), an outer race (2) and a circumferential of rolling elements (3) rollingly interposed between the inner and outer races (1) and (2). An electrically insulating layer (4) is formed on a surface of one of the inner and outer races (1) and (2), which is held in contact with a housing or a shaft when the rolling bearing assembly is mounted. This electrically insulating layer (4) is made of a gray alumina containing $Al_2O_3$ mixed with $TiO_2$ in a quantity chosen to be equal to or smaller than 1 wt % relative to the total weight of the gray alumina.

4 Claims, 3 Drawing Sheets

ROLLING BEARING ASSEMBLY HAVING AN IMPROVED RESISTANCE TO ELECTRIC CORROSION

BACKGROUND OF THE INVENTION

1. Field of the Invention

The present invention generally relates to a rolling bearing assembly used in, for example, a multipurpose drive motor, an electric power generator and a traction motor for electric railway cars and, more particularly, to the rolling bearing assembly having an improved resistance to electric corrosion, which can be suitably used in an environment where an electric current flows.

2. Description of the Prior Art

As is well known to those skilled in the art, the rolling bearing assembly employed in a traction motor for electric railway cars is generally so designed that, in the event of troubles occurring in an earthed collector for grounding an electric current from the railway traction motor to the rails through wheels, the electric current flowing in the railway traction motor flows through inner and outer races and rolling elements of the rolling bearing assembly before it is grounded to the rails. Accordingly, sparking takes place between the rolling elements and raceway grooves in one or both of the outer and inner races, accompanied by an electric corrosion of the component parts of the rolling bearing assembly. Once this occurs, the lifetime of the rolling bearing assembly is shortened.

In order to minimize the electric corrosion, it has been suggested to form an electric insulating layer of a synthetic resin on a surface area of the outer race, which is held in contact with a housing for supporting the rolling bearing assembly. However, the electric insulating layer made of a synthetic resin has so large a coefficient of linear thermal expansion that an error tends to occur in fit between the outer race and the housing by the effect of heat evolved by the rolling bearing assembly during the operation of the rolling bearing assembly.

In view of the above, for material of the electric insulating layer, a ceramic material is considered feasible because of its low coefficient of linear thermal expansion and high electric insulating property and, in fact, the Japanese Laid-open Utility Model Publication No. 2-46119 and the Japanese Laid-open Patent Publication No. 2002-48145, for example, disclose a thermal spraying in which a ceramic material is sprayed to form a ceramic layer as an electric insulating layer. The thermally sprayed insulating layer has a film thickness so chosen as to secure a required electric insulating property that can be satisfied with a commercially available high insulating material.

Alumina ($Al_2O_3$) and gray alumina ($Al_2O_3+TiO_2$) are well known as a ceramic material that can be used to form a thermally sprayed ceramic layer as an electric insulating layer. Comparing those ceramic materials with each other, they have the following representative characteristics, which differ as follows:

Volumetric Resistivity White Alumina>Gray Alumina
Dielectric breakdown voltage White Alumina>Gray Alumina
Yield at Thermal Spraying White Alumina<Gray Alumina Since gray alumina contain $TiO_2$, which is an electroconductive substance, the volumetric resistivity of the gray alumina tends to become lower than that of white alumina. The greater the content of $TiO_2$ in the gray alumina, the lower the volumetric resistivity thereof. Accordingly, the white alumina is rather feasible if a high electric insulation performance is of prime importance.

It has been empirically known that for a given film thickness the white alumina exhibits a higher dielectric breakdown voltage than that exhibited by the gray alumina and, therefore, the white alumina is considered feasible where a high dielectric breakdown voltage is of prime importance.

The white alumina has a melting point higher than 2,000° C. whereas the $TiO_2$ has a melting point lower than 2,000° C. Accordingly, the gray alumina containing $TiO_2$, when thermally sprayed, exhibits a high deposit efficiency and, as such, the white alumina, when compared with the gray alumina, does not bring about a high deposit efficiency and, hence, a poor yield of deposition. The term "deposit efficiency" referred to above and hereinafter stands for what fraction of the amount of the spraying material used to thermally spray on a component to be coated is actually deposited on the component to form the coating or layer. Thus, it will readily be seen that, in order to secure a predetermined film thickness, the gray alumina capable of bringing about a good yield of deposition during the thermal spraying can be considered feasible.

The volumetric resistivity and measurements conducted in the past to determine and the dielectric breakdown voltage have made it clear that the white alumina has an electric insulation performance superior to that exhibited by the gray alumina, but as far as the deposit efficiency during the thermal spraying is concerned, the white alumina is rather inferior to the gray alumina.

As discussed above, as a material for the electric insulating layer to be employed in the rolling bearing assembly, the white alumina and the gray alumina have their own merits and demerits in respect of their performance and moldability and, therefore, unless the proper material is chosen, the rolling bearing assembly would provide no proper performance of resistance to electric corrosion and require complicated and time-consuming assemblage, accompanied by increase of the cost.

SUMMARY OF THE INVENTION

In view of the foregoing, the present invention has been devised to provide a rolling bearing assembly having an improved resistance to electric corrosion, which can provide a proper performance and can be assembled at a reduced cost.

In order to accomplish the foregoing object, the present invention provides a rolling bearing assembly having an improved resistance to electric corrosion, which includes a first raceway member, a second raceway member positioned inside the first raceway member, a circumferentially extending row of rolling elements rollingly interposed between the first and second raceway members, and an electrically insulating layer formed on a surface of one of the first and second raceway members which is held in contact with a housing or a shaft when the rolling bearing assembly is mounted on the housing or the shaft. The electrically insulating layer is made of a gray alumina containing $Al_2O_3$ mixed with $TiO_2$, the content of $TiO_2$ in the gray alumina being chosen to be equal to or smaller than 1 wt % relative to the total weight of the gray alumina.

Where the gray alumina is employed as a material for the electrically insulating layer, the insulating layer is required to have a film thickness greater than when the white alumina is employed since the gray alumina has an insulation performance lower than that exhibited by the white alumina. However, considering that the range of error in film thickness formed by the thermal spraying is about 0.1 mm, the use of the gray alumina containing $TiO_2$ that requires the eventually formed insulating layer to have a film thickness greater by about 0.1 mm than that of the insulating layer made of the white alumina can bring about a dielectric breakdown voltage about equal to that exhibited by the use of the white alumina. A series of experiments conducted have revealed that 1 wt % or smaller relative to the total weight of the gray alumina is presumed to be satisfactory for the content of $TiO_2$ that requires the eventually formed insulating layer to have a film thickness greater by about 0.1 mm than that of the insulating layer made of the white alumina. As discussed hereinbefore, the gray alumina exhibits a high deposit efficiency and, hence, a good yield as compared with those of the white alumina and, therefore, the insulating layer can be formed at a reduced cost. For this reason, by the use of the gray alumina containing $TiO_2$ in a quantity equal to or smaller than 1 wt % relative to the total weight of the gray alumina, the insulating layer having an insulation performance comparable with that afforded by the use of the white alumina can be formed at a reduced cost.

In the practice of the present invention, the content of $TiO_2$ in the gray alumina forming the insulating layer is preferably within the range of 0.25 to 0.75 wt % relative to the total weight of the gray alumina. Although the dielectric breakdown voltage decreases as the content of $TiO_2$ increases, a series of experiments have revealed that if the content of $TiO_2$ in the grey alumina is equal to or smaller than 0.75 wt %, increase of the film thickness by 0.05 mm more than that required when the white alumina is used is effective to provide the dielectric breakdown voltage equal to that afforded by the white alumina. If the content of $TiO_2$ is, however, smaller than 0.25 wt %, no satisfactory result can be obtained with respect to the deposit efficiency and the yield of deposition, although a satisfactory dielectric breakdown voltage characteristic can be obtained.

The insulating layer has a multiplicity of micropores, which are sealed, and may exhibit an insulation resistance at the applied voltage of 500 volt, which is 1,000 MΩ or higher as calculated for of 330 cm² of the surface area to be covered by the insulating layer of 0.1 mm in film thickness, and also exhibit a dielectric breakdown voltage of 3.5 kv or higher as calculated with 0.2 mm in film thickness.

It is to be noted that considering that the rolling bearing assemblies are currently available in a number of types and, hence, have different dimensions and surface areas to be thermally sprayed to form the insulating layer as well as the film thickness of the resultant insulating layer varies depending on the type of the bearing assembly. However, the insulating layer preferred in the practice of the present invention is considered feasible and acceptable if it can exhibit the insulation performance that satisfies any one of the following known equation (1) for calculating the insulation resistance of a planar body, equation (2) for calculating the insulation resistance of an annular body, equation (3) for calculating the planar dielectric breakdown voltage and equation (4) for calculating the annular dielectric breakdown voltage:

$$R = \rho t/S \quad (1)$$

$$R = (\rho/2\pi B) \cdot [\ln(D+2t)/D] \quad (2)$$

$$V = Et \quad (3)$$

$$V = 0.5 E \cdot D \cdot \ln(D+2T)/D \quad (4)$$

In those equations, R represents the insulation resistivity; ρ represents the volumetric resistivity; t represents the film thickness of the insulating layer; S represents the surface area desired to be electrically insulated; B represents the width of the annular body; D represents the diameter of the annular body; V represents the dielectric breakdown voltage; and E represents the dielectric breakdown strength.

The insulation performance of the insulating layer satisfying any one of the foregoing equations (1) to (4) can be considered useful generally for multi-purposes in the market and, as compared with the conventional rolling bearing assembly, the cost can be reduced considerably.

Preferably, the insulating layer may be a thermally sprayed insulating layer having a film thickness within the range of 0.1 to 0.8 mm. Where the thermally sprayed insulating layer has a film thickness within this range of 0.1 to 0.8 mm, the present invention can be applied to a maximum available size of the existing rolling bearing assembly and the cost of assemblage of the rolling bearing assembly can advantageously be reduced while the sufficient insulation performance is secured.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
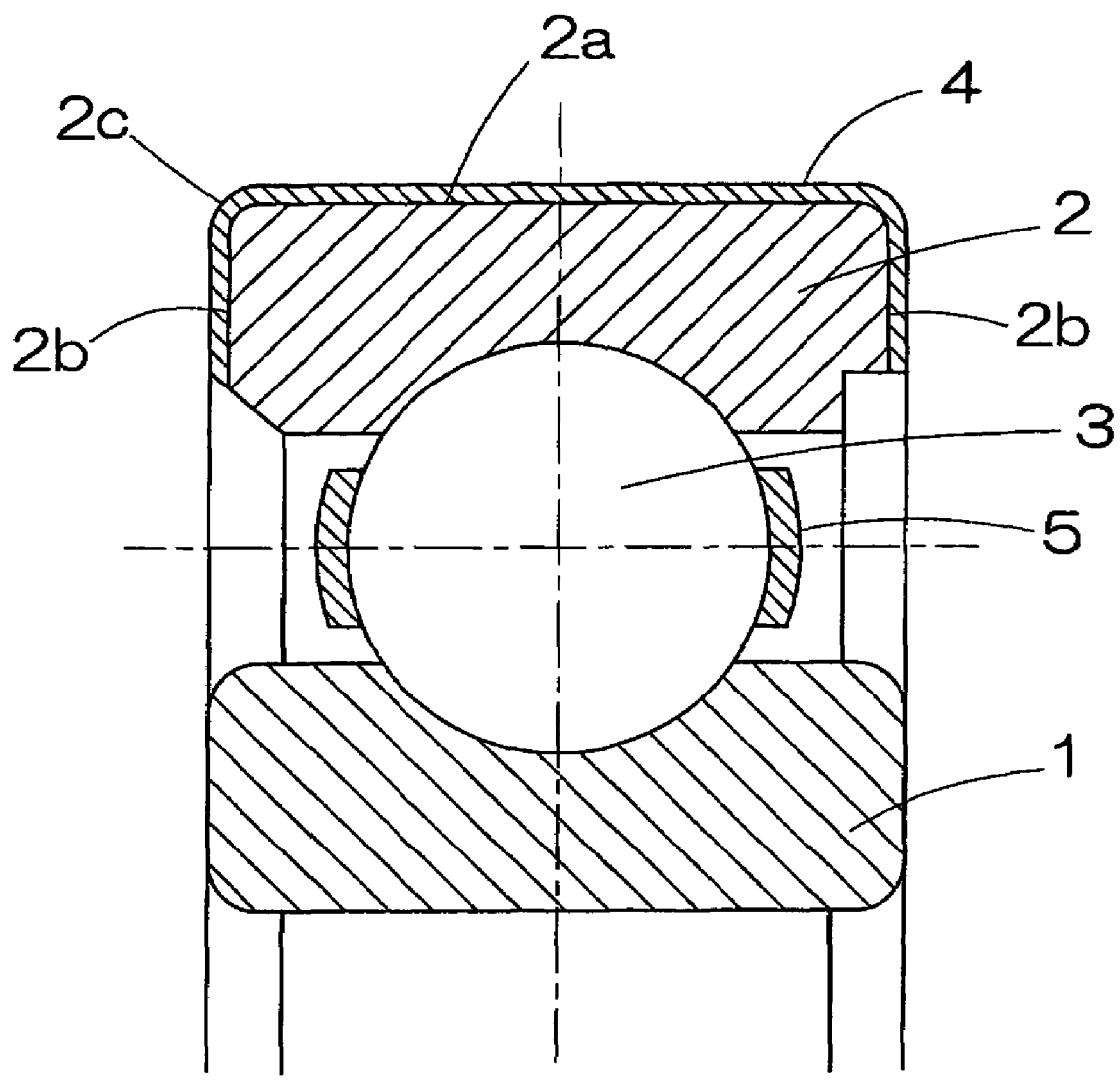
FIG. 1 is a fragmentary longitudinal sectional view of a rolling bearing assembly having an improved resistance to electric corrosion according to a preferred embodiment of the present invention.

Referring first to FIG. 1 showing a first preferred embodiment of the present invention, a rolling bearing assembly having an improved resistance to electric corrosion includes inner and outer races 1 and 2, which are raceway members made of a metallic material such as bearing steel, and a circumferentially extending row of rolling elements 3 interposed between the inner and outer races 1 and 2 and rollingly received in part within a raceway groove in an outer peripheral surface of the inner race 1 and in part within a raceway groove in an inner peripheral surface of the outer race 2. The outer race 2 has an electrically insulating ceramic layer 4. This rolling bearing assembly is used for, for example, rotatably supporting a rotor of the traction motor for railway cars and is in the form of a deep groove ball bearing. The rolling elements 3 are operatively retained in a circumferential row by a roller retainer or cage 5.

The position of the insulating layer 4 is a surface of the outer race 2, which is held in contact with a housing when the outer race 2 is mounted in the housing. In the illustrated embodiment, the position of the insulating layer 4 is an entire outer surface of the outer race 2 including an outer peripheral surface 2a and opposite end faces 2b. So to speak, the illustrated insulating layer 4 extends in a direction circumferentially of the outer race 2 and continuously covers one end face 2b to the opposite end face 2b via chamfered corner regions 2c each between the outer peripheral surface 2a and the respective end face 2b.

The ceramic material that eventually forms the insulating layer 4 includes a gray alumina containing $Al_2O_3$ mixed with $TiO_2$. The content of $TiO_2$ in the gray alumina is equal to or smaller than 1 wt % relative to the total weight of the gray alumina. The insulating layer 4 is a thermally sprayed insulating layer, i.e., a layer formed by depositing the gray alumina onto the outer race 2 by means of a thermal spraying technique, and has a multiplicity of micropores, which are, after the thermal spraying, sealed so that an electroconductive liquid medium will not soak into those micropores. The sealing of the micropores can be accomplished by allowing the insulating layer 4 to impregnate with a bonding agent having an excellent permeability. This sealing treatment is carried out for the purpose of sealing the micropores in the insulating layer 4 so that an external electroconductive liquid medium such as a moisture component present in the atmosphere will not soak into the micropores in the insulating layer 4. This treatment is generally practiced in the manufacture of ceramic sprayed insulating bearing assemblies. In view of tests and evaluation as will be discussed in detail subsequently, the insulating layer 4 has a thermally sprayed film thickness within the range of 0.1 to 0.8 mm.

The insulating layer 4 exhibits particular insulation performance. Preferably, the insulating layer 4 after the sealing treatment exhibits an insulation resistance of 1,000 MΩ or higher at 500 volts applied, as calculated for 330 $cm^2$ of the surface area of the outer race 2 to be covered by the insulating layer of 0.1 mm in film thickness and also exhibits a dielectric breakdown voltage of 3.5 kv or higher when the film thickness thereof is 0.2 mm.

The reason for the selection of the particular material and the particular film thickness for the insulating layer 4 will now be discussed.

The tests to determine the insulation performance and the evaluation of those tests, both conducted in the past, have revealed that the insulation resistance and the dielectric breakdown voltage could attain the respective levels discussed below.

In the case of the rolling bearing assemblies having the respective outer races of 120 mm, 125 mm and 150 mm in outer diameter, onto which the corresponding insulating layers were formed by thermally spraying the gray alumina to a film thickness of 0.4 mm, those insulating layers exhibited the insulation resistance of 1,000 MΩ or higher (when 500 volts was applied) and the dielectric breakdown voltage of 3.6 to 3.9 kv. The content of $TiO_2$ contained in the gray alumina used was about 2.5 wt %.

In the case of the white alumina sprayed insulating layer, that is, where the insulating layer was formed by thermally spraying the white alumina, and if the film thickness thereof is 0.25 mm, the dielectric breakdown voltage reaches a level of 6 kv or higher, which is deemed to be a considerable difference from that exhibited by the above gray alumina sprayed insulating layer. It is, however, to be noted that when the film thickness was 0.1 mm or greater, the insulation resistance reached a level of 1,000 MΩ or higher (when 500 volts was applied).

Based on the empirical measurements referred to above, sample outer races of 170 mm in outer diameter were prepared, which had gray alumina sprayed insulating layers containing $TiO_2$ in a quantity of 0.25 wt % and 0.75 wt % relative to the total weight of the gray alumina, respectively, and were tested to determine the insulation performance, which was subsequently compared with that exhibited by a sample outer race having the white alumina sprayed insulating layer. As a result of the comparison, both of the sample outer races exhibited the insulation resistance of 1,000 MΩ or higher (when 500 volts was applied) when the film thickness was 0.1 mm and it has therefore been confirmed that a high resistance can be obtained even with a small film thickness.

Figure 2:
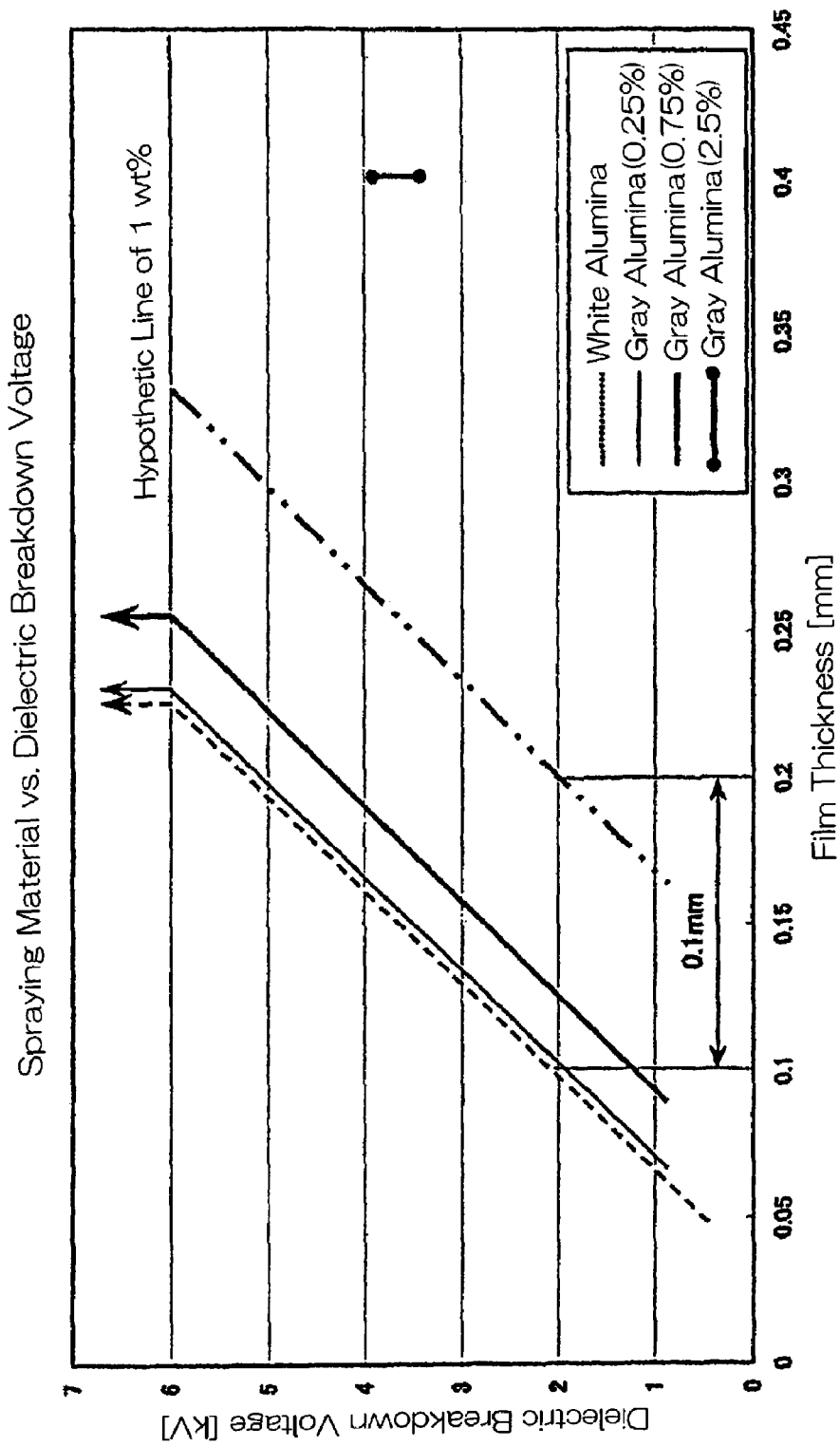
FIG. 2 is a chart showing a relationship between the dielectric breakdown voltage and some thermal spraying materials.

Also, as shown in FIG. 2 showing the result of tests conducted to determine the relation between the thermal spraying material and the dielectric breakdown voltage characteristic, it is clear that the dielectric breakdown voltage decreases with increase of the content of $TiO_2$ in the gray alumina.

When the ceramic material is thermally sprayed to the bearing outer race, it is a general practice to spray and cool (by the use of a cooling air) the outer race while the outer race is rotated. At this time, the film thickness formed by a single pass of thermal spraying on the same area of the outer race is said to be about 30 μm and, therefore, it is generally recognized that increase of the film thickness results in proportional increase of the spraying time required to complete the thermal spraying and, hence, brings about a considerable influence on the film making cost. Accordingly, where the cost reduction is of prime concern, the film thickness is preferably of a value as small as possible. It is also recognized that increase of the film thickness may bring about surface irregularities on the surface of the sprayed layer and, therefore, a substantial machining would be required after the thermal spraying, requiring an increased number of the processing steps.

By way of example, referring to the results on the dielectric breakdown voltage characteristics shown in FIG. 2, comparing the white alumina and the gray alumina (with the $TiO_2$ content of 0.75 wt %), the gray alumina sprayed insulating layer must have a film thickness about 0.05 mm greater than that of the white alumina sprayed insulating layer where the gray alumina layer is desired to exhibit the same dielectric breakdown voltage as the white alumina layer. This increment of about 0.05 mm in film thickness corresponds to the film thickness obtained generally by a single pass of thermal spraying. Increase of the film thickness by such increment would not result in a considerable difference in cost incurred by the thermal spraying process. However, when it comes to the rolling bearing assembly having the outer race deposited with the gray alumina sprayed insulating layer containing $TiO_2$ in a quantity of 2.5 wt % relative to the total weight of the gray alumina, the gray alumina sprayed insulating layer must have a film thickness about 0.25 mm greater than that of the white alumina sprayed insulating layer when compared at the dielectric breakdown voltage of 3.8 kv, which increment of about 0.25 mm corresponds to the film thickness obtained generally by eight to nine passes of thermal spraying. Hence, with the machining allowance after the thermal spraying process taken into consideration, the gray alumina sprayed insulating layer as formed by the thermal spraying would require a film thickness that is about twice that of the white alumina insulating layer.

In practice, however, since the gray alumina exhibits a higher deposit efficiency than that of the white alumina, the difference in film thickness discussed above would not directly reflect on the processing cost, but if the deposit efficiency of the gray alumina differs from that of the white alumina by a factor of 2 or smaller, the processing cost would be inevitably affected.

Considering that the range of allowance of the film thickness during the thermal spraying process is about 0.1 mm, the above discussed increment of film thickness in the grey alumina layer may be considered within the allowance from the standpoint of cost. Accordingly, with the gray alumina sprayed insulating layer having a $TiO_2$ content that requires the film thickness to be increased about 0.1 mm greater than that of the white alumina sprayed insulating layer, the dielectric breakdown voltage about equal to that exhibited by the white alumina sprayed insulating layer can be obtained and, therefore, the use of the gray alumina sprayed insulating layer would not result in a considerable increase of the cost.

From the result exhibited in FIG. 2 by the use of the gray alumina having a $TiO_2$ content of 0.75 wt %, it can be considered sufficient if the $TiO_2$ content in the gray alumina used to form the gray alumina sprayed insulating layer, which requires the gray alumina sprayed insulating layer to have an additional 0.1 mm increase of the film thickness as compared with that of the white alumina sprayed insulating layer, is 1 wt %. It is, however, to be noted that the content of $TiO_2$ in the gray alumina to be actually employed in the practice of the present invention is preferred to be smaller than 0.75 wt %, which has been ascertained sufficient as far as the tests discussed above are concerned.

According to the samples prepared for the test purpose on this occasion, the white alumina when thermally sprayed has represented virgin white in color and has been found undergoing a considerable change in color when the sealing treatment was carried out after the thermal spraying. The change in color of the surface of the white alumina sprayed layer results from deposit of a resinous material, used for the sealing treatment, on the surface other than the micropores when the resinous material is dried to solidify. However, the discoloration does not adversely affect the insulation performance. While discolored portions of the outer peripheral surface and the opposite end faces of the outer race can be removed by and during the subsequent machining process, discolored portions remain unremoved in the chamfered areas of the outer race even after the rolling bearing assembly is completely assembled. If the resinous material having been deposited unevenly is dried, surface irregularities occur and deteriorate the appearance of the outer race and, hence, the rolling bearing assembly.

However, with the gray alumina, it has been found that the gray alumina sprayed insulating layer as formed by the thermally spraying is colored and represents a good appearance even after the sealing treatment. Although change in color would in no way adversely affect on the insulation performance, the quality of the appearance is also important and, therefore, the use of the gray alumina is preferred from the standpoint of the appearance.

The insulation performance herein discussed in connection with the preferred embodiment of the present invention is also affected by the type of the sealing treatment employed. Specifically, when the sealing treatment is carried out to the white alumina sprayed insulating layer and the gray alumina sprayed insulating layer (of which the $TiO_2$ content is 1 wt %), the sealing treatment must be such that, where the surface area to be covered by the thermally sprayed insulating layer is 330 cm², the insulation resistance should be 1,000 MΩ or higher (when 500 volts is applied) for the film thickness of 0.1 mm and the dielectric breakdown voltage should be 2 kv or higher for the film thickness of 0.2 mm. 330 cm² of the surface area to be covered by the sprayed insulating layer corresponds generally to the surface area where in the outer race having an outer diameter of 170 mm and a width of 39 mm, a region of 12 mm in a radial direction of the opposite end faces and the outer peripheral surface of the outer race is thermally sprayed with the ceramic material.

In view of the foregoing, in order to examine how the sealing treatment affects the film thickness of the insulating layer formed by the thermal spraying process, a plurality of samples were tested and evaluated. Those samples include outer races, all 170 mm in outer diameter and 39 mm in width, having their outer peripheral surfaces and opposite end faces machined and subsequently deposited with white alumina sprayed insulating layers and gray alumina sprayed insulating layers of a film thickness ranging from 0.05 mm to 0.45 mm at intervals of 0.1 mm. The samples were, after the corresponding insulating layers have been formed, subjected to the sealing treatment (using the insulation material as discussed hereinbefore) to seal the micropores present in the insulating layers, and the layer deposited outer peripheral surfaces and opposite end faces were then machined. From the evaluation of those samples, it has been found that the samples with 0.05 mm in film thickness had a problem in that the film thickness of the insulating layer was locally smaller than necessary due to the machining error (particularly, the machining of the opposite end faces was time-consuming) and that the lowermost limit of the film thickness permissible in the practice of the present invention should therefore be about 0.1 mm.

The samples of the specified dimensions referred to above and used for the evaluation have been found having an insulation performance that can be acceptable for general purposes in the market. It has also been found that in order to reduce the cost more than that incurred by the conventional articles, formation of the insulating layer to a film thickness of 0.2 mm with the use of the gray alumina containing the $TiO_2$ content within the range of 0.25 to 0.75 wt % is feasible for the advantages of the present invention. The insulation performance exhibited by this specific insulating layer is such that the insulation resistance is 1,000 MΩ or higher (when 500 volts is applied) and the dielectric breakdown voltage is 3.5 kv or higher.

It is, however, to be noted that in the case of those samples of the specified dimensions, when the rolling bearing assembly reaches a temperature of 120° C., the insulation resistance has been found decreasing down to about 10 MΩ. This reduction of the insulation resistance results from the temperature dependent characteristic of the insulation resistance of the grey alumina and the white alumina (i.e., the phenomenon in which the resistance decrease with increase of temperature) and is hence unavoidable. Although the insulation resistance of 10 MΩ at 120° C. appears to be a practically acceptable performance, increase of the surface area to be insulated concomitant with increase of the dimensions results in decrease of the insulation resistance and, therefore, it is necessary to increase the film thickness by a quantity sufficient to compensate for reduction in insulation resistance. Considering that the surface area to be thermally sprayed of a maximum size of the conventional articles accepted in the market is about four times that of the samples employed in the evaluation discussed above, it appears that an article having a film thickness of about 0.8 mm would be required in the future.

Although in the foregoing embodiment shown and described with reference to FIGS. 1 and 2, the insulating layer 4 has been shown and described as formed on the outer race 2, the insulating layer 4 can be also formed on the inner race 1. Where the insulating layer 4 is formed on the inner race 1, the insulating layer 4 is applied to an inner peripheral surface of the inner race 1, which is held in contact with, for example, a shaft, and/or annular end faces of the inner race 1.

Also, in the foregoing embodiment, the tests and evaluation were made with the sprayed insulating layer as being of a single layer structure, the present invention can be equally applied even where a coated layer of a raceway member is of a double- or triple-layered structure. In addition, although in describing the foregoing embodiment the sprayed insulating layer 4 has been formed on the outer race 2 of the deep groove ball bearing assembly, the present invention can also be applied to any other rolling bearing assembly such as a cylindrical roller bearing assembly or a tapered roller bearing assembly.

Figure 3:
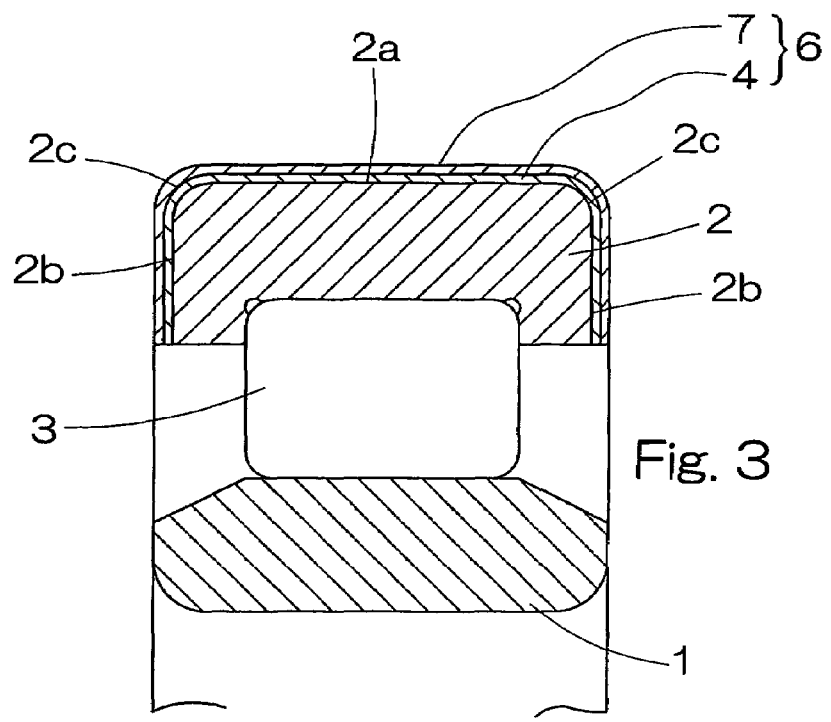
FIG. 3 is a view similar to FIG. 1, showing another preferred embodiment of the present invention.

Referring to another preferred embodiment of the present invention shown in FIG. 3, a coated layer 6 formed on the outer race 2 is of a double-layered structure including an insulating layer 4 and a metallic layer 7 covering the insulating layer 4. The metallic layer 7 is utilized to increase the adhesion of the insulating layer 4 on the outer race 2 and also to avoid an exfoliation of the insulating layer 4, which would otherwise occur when the bearing assembly and, hence, the outer race 2 is press-fitted into the housing. The insulating layer 4 in this double-layered structure is made of the same material and has the same film thickness as the insulating layer 4 discussed in connection with the foregoing embodiment. It is, however, to be noted that the embodiment of FIG. 3 is shown as applied to the cylindrical roller bearing assembly.

Figure 4:
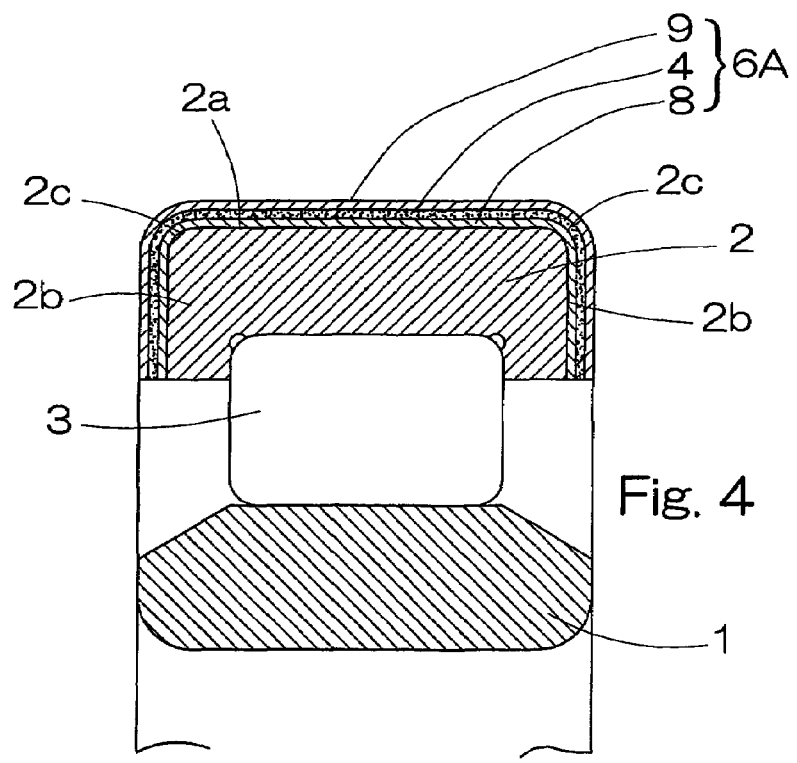
FIG. 4 is a view similar to FIG. 1, showing a further preferred embodiment of the present invention.

FIG. 4 illustrates a further preferred embodiment of the present invention, in which a coated layer 6A formed on the outer race 2 is of a triple-layered structure including an inner metallic layer 8 adjacent the outer race 2, an insulating layer 4 and an outer metallic layer 9 positioned on one side of the outer race 2 remote from the inner metallic layer 8. The inner metallic layer 8 is utilized to increase the capability of thermal spraying of the insulating layer 4 made of the previously discussed ceramic material and the outer metallic layer 9 serves to avoid an exfoliation of the insulating layer 4. Even in this embodiment, the insulating layer 4 in this triple-layered structure is made of the same material and has the same film thickness as the insulating layer 4 discussed in connection with the first embodiment. The embodiment of FIG. 4 is also shown as applied to the cylindrical roller bearing assembly.

The present invention having been fully described above, it has now become clear that since one of the raceway members has the ceramic insulating layer formed on a surface thereof, which is held in contact with a housing or a shaft and the ceramic insulating layer is prepared of the gray alumina having the TiO2 content of 1 wt % or smaller relative to the total weight of the gray alumina, the rolling bearing assembly can be manufactured at a reduced cost while securing a required electric insulating performance.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rolling bearing assembly, comprising:
   a first raceway member;
   a second raceway member positioned inside the first raceway member;
   a circumferentially extending row of rolling elements rollingly interposed between the first and second raceway members; and
   an electrically insulating layer formed on a surface of one of the first and second raceway members, which is held in contact with a housing or a shaft when the rolling bearing assembly is mounted on the housing or the shaft, the electrically insulating layer being made of a gray alumina containing $Al_2O_3$ mixed with $TiO_2$ in a quantity chosen to be equal to or smaller than 1 wt % relative to the total weight of the gray alumina.

2. The rolling bearing assembly as claimed in claim 1, wherein the content of $TiO_2$ in the gray alumina forming the insulating layer is within the range of 0.25 to 0.75 wt % relative to the total weight of the gray alumina.

3. The rolling bearing assembly as claimed in claim 1, wherein the insulating layer has a multiplicity of pores, which are sealed, and
   the insulating layer exhibits an insulation resistance at the applied voltage of 500 volt, which is 1,000 MΩ or higher as calculated for a 330 cm² surface area to be covered by the insulating layer of 0.1 mm in film thickness, and also exhibits a dielectric breakdown voltage of 3.5 kv or higher as calculated with 0.2 mm in film thickness.

4. The rolling bearing assembly as claimed in claim 1, wherein the insulating layer is a thermally sprayed insulating layer having a film thickness within the range of 0.1 to 0.8 mm.

* * * * *